United States Patent
Singhal (10) Patent No.: US 8,464,334 B1
(45) Date of Patent: Jun. 11, 2013

(54) SYSTEMS AND METHODS FOR COMPUTER NETWORK DEFENSE II

(76) Inventor: Tara Chand Singhal, Torrance, CA (US)

(*) Notice: Subject to any disclaimer, the term of this patent is extended or adjusted under 35 U.S.C. 154(b) by 1252 days.

(21) Appl. No.: 12/148,042

(22) Filed: Apr. 16, 2008

Related U.S. Application Data (60) Provisional application No. 60/925,027, filed on Apr. 18, 2007.

(51) Int. Cl.
*H04L 29/06* (2006.01)

(52) U.S. Cl.
USPC .......................................................... 726/13

(58) Field of Classification Search
USPC .......................................................... 726/13
See application file for complete search history.

(56) References Cited

U.S. PATENT DOCUMENTS

| | | | | |
|---|---|---|---|---|
| 6,510,154 B1 * | 1/2003 | Mayes et al. | ............... | 370/389 |
| 7,194,004 B1 * | 3/2007 | Thomsen | ............... | 370/401 |
| 7,757,272 B1 * | 7/2010 | Dean | ............... | 726/2 |
| 8,037,530 B1 * | 10/2011 | Fink et al. | ............... | 726/23 |
| 2002/0194378 A1 * | 12/2002 | Foti | ............... | 709/246 |
| 2003/0204728 A1 * | 10/2003 | Irwin | ............... | 713/176 |
| 2006/0136599 A1 * | 6/2006 | Tung | ............... | 709/245 |
| 2006/0280191 A1 * | 12/2006 | Nishida et al. | ............... | 370/401 |
| 2008/0005264 A1 * | 1/2008 | Brunell et al. | ............... | 709/217 |
| 2008/0022084 A1 * | 1/2008 | Raftelis et al. | ............... | 713/153 |
| 2008/0034201 A1 * | 2/2008 | Munger et al. | ............... | 713/153 |
| 2008/0140847 A1 * | 6/2008 | Almog | ............... | 709/228 |
| 2008/0196098 A1 * | 8/2008 | Cottrell et al. | ............... | 726/12 |

* cited by examiner

*Primary Examiner* — Michael S McNally
(74) *Attorney, Agent, or Firm* — Steve Roeder Esq.

(57) ABSTRACT

This invention discloses a technique of computer network defense. The technique is called Random IP-Security (RIP-Sec) 30, and it may preferably be deployed in the gateway 18 and other routers 20 of a computer network. The RIP Sec 30 technique uses a unique randomization of the existing artifacts of a data packet. These artifacts of a data packet are IP addresses of the packet. The unique randomization is able to substitute one value of the artifact with another exactly identical value of the artifact, that is, an IP address is replaced by another IP address, where the replaced IP address have no relationship to the original IP address, they having been derived from a unique randomization process of the original data.

20 Claims, 7 Drawing Sheets

SYSTEMS AND METHODS FOR COMPUTER NETWORK DEFENSE II

CROSS REFERENCE

This application claims priority on Provisional Application Ser. No. U.S. 60/925,027, titled "Computer Network Defense II" filed on Apr. 18, 2007, by Tara Chand Singhal. The contents of the Provisional Application Ser. No. 60/925,027 are incorporated herein by reference.

FIELD OF THE INVENTION

The present invention is directed to systems and methods for computer network defense that quickly and efficiently separate trusted data packets in the network from un-trusted data packets from being processed and or routed in the network.

BACKGROUND

A global computer network uses routers to route packet based data traffic from a source computer or a server to a destination computer or server. A router in a network may perform different functions or roles. There are border routers to a network that are situated between a businesses internal network and Internet Service provider to the global network. The border router, also called a gateway router, protects or acts as gatekeeper based on a security policy for an internal computer network of a business. Then there are internal routers that connect and mediate traffic between computers of a business's internal network. A business's networks that are protected by a one or more border routers or gateway routers are also called autonomous networks.

There are generally two classes of traffic among the routers; one is for the network maintenance based on many existing protocols such as BGP, IGP and RIP between local network and global network routers. The other is for user traffic from one source server to a destination source server. Based on many news items, these autonomous networks of a business are under constant cyber attack from entities through out the global network using either one or both of the traffic types.

There are different methods of attack on a network using many new and evolving methods. One type of attack is to overload the system by sending large traffic to a single node and is called denial of service attack. The other type of attack attempts to get inside the network by various ruses that make the attack traffic indistinguishable from other traffic at the border routers that screen the traffic. The purpose of this type of attack is to learn and/or steal valuable data and information that is stored inside the servers of the network.

There have been developed many forms of defenses to counter these different types of attacks. The main one is firewall that can screen traffic based on access control lists and filter traffic based on predefined signatures in the data. As an additional means of security, in prior art, filters are used to filter the contents of data packets that have a signature representing a known anomaly, such as a virus, worm etc. Such filters are used in the host and may be used in some gateway routers and are not used in the routers in the network.

The other type of defense is to measure the statistical behavior of traffic and to compare that with the normal traffic to determine if an attack is happening. For such security situations, defensive techniques of packet flow traffic analysis are used to discern anomalous rate of packet flow by comparing them with the normal traffic flow patterns. The audit log files are examined either in real time or after the attack to determine if an attack has happened in the past. These techniques have been given the names of Intrusion Detection and Prevention Systems (IDS/IPS) by the information security industry.

Another type of defense is to encrypt the packet. To provide security during transmission of the data packet, the data part is encrypted by the sending computer and decrypted by the receiving computer. To provide additional security of that of to prevent data flow analysis of data packets by adversaries based on source and destination IP addresses, it is desirable to hide the source and destination addresses of the packet. For this purpose, prior art uses a scheme identified as IP Sec protocol that is widely used in the industry and that in that the entire packet including the header part and the data part is encrypted and a new header called outer header is added. The IP Sec function may be performed between the gateway routers of networks.

All of these defenses have problems and are not entirely successful in their defenses and attacks still take place. In spite of these defenses, based on published news items, harm-causing packets are still introduced in the network. If there is no prior signature for a known anomaly, then it is not possible to filter data packets. Hence the harm intentioned packets are indistinguishable from other packets and cannot be separated based on the content of the packet, either in the header or the data.

The underlying reasons for such attacks is that the source and destination IP addresses are entirely made up by a sender, and hence there is no assurance to the receiver of a data packet that these are genuine.

Hence, it is an objective of this invention to teach new types of computer network defense techniques that are, believed to be, more effective and address the underlying reasons why such attacks are successful. Author has filed many patents, that teach other types of network defenses. This application teaches yet another type of computer network defense.

SUMMARY

This invention teaches systems and methods that enables the two IP addresses in a packet, that of source and destination computers or source and destination routers that are part of a local or global network, to be verified at either in-route or border routers or both.

The systems and methods use a process that alters or camouflages the original or true IP addresses, at either the sending computer, or the sending border router, or sending in-route router, with a randomly obtained alias IP address. The alias IP address is indistinguishable from the real IP address having been obtained from a randomly ordered list of real IP addresses. So that, for a packet it cannot be determined if the IP address is real or alias, except by the border router or the in-route router that would screen and/or route such packets. These routers, equipped with this process, can screen packets based on IP addresses. The last router before the destination, equipped with this process, is able to remove this camouflage so that the destination computer or router can receive such a packet with original IP addresses.

When this process is implemented in each in-route router, where a routing decision would be made, that router is capable of unmasking the original destination IP address and making a routing decision and then re-masks the IP address with a different camouflage IP address. However not all in-router routers need provide that ability or function. Instead, a set of selected trusted routers in the global network or an internal to business network may be equipped to serve this function.

Hence, each packet that is sent from the sending computer or router to the destination computer or router may have a randomly obtained source and destination IP addresses, hiding the true origin as well as the destination of packets. This technique is given the name Random IP Security or RIP Sec, for short.

Since, primarily the destination IP address in a packet is used for routing decisions inside a local or global network, and the source IP address is used for screening decisions at a border or gateway router, this technique can be applied separately to each type of IP address independently based on specific defense needs.

This specification, however, focuses on applying it for the source IP addresses and a similar approach is viable for the destination IP addresses except this needs to be implanted in more in-route routers, though not all, whereas the other one may be implemented in the border routers of a network or the sending and receiving servers only.

When the RIP Sec is implemented in border routers of a network, the benefits of RIP Sec are, that each outgoing packet has a different Source IP address from a random IP address (RIP) list making any kind of traffic analysis impossible. It preserves the ability of access control lists to screen incoming and outgoing traffic, The RIP lists, being made up random order of existing IP addresses, do not have any thing that would require their extra protection in the border router. The RIP lists may be refreshed periodically.

RIP Sec is meant to function as an outermost layer of defense to a network and does not preclude any other prior art defenses that may be deployed elsewhere in the network. This RIP Sec process efficiently and quickly, it is believed, would separate trusted packets from un-trusted packets by verifying the original source IP address.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts. The drawings are.

DESCRIPTION

Introduction

This invention disclosing systems and methods of computer network defense that use IP addresses in each packet that are randomly obtained and are randomly different for each incoming and outgoing packet.

The network defense based on using random IP addresses uses a unique randomization of the existing artifacts of a data packet. These artifacts of a data packet are source and destination computer IP address. These two artifacts, that of the destination IP address and the source IP address are an essential part of any data packet. The IP addresses are used to identify the source and destination computers and are present in the header of each packet. These IP addresses are based on the Internet protocol.

The unique randomization of the IP address of this invention is able to substitute one value of the artifact with another exactly identical value of the artifact, and thus hide the operation of the substitution itself. That is, one IP address is replaced by another IP address, where the replaced IP address has no discernible mathematical relationship to the original IP address, it having been derived from a unique randomization process of the original IP address data. The randomization process is fast and efficient, in that it does not use standard mathematical encryption and can be performed inline for every incoming and outgoing packet quickly and efficiently.

A benefit of this defense function is that this defense function of RIP Security is hidden in not being discernible in having been applied to the packets traveling the network. The routers of the network are usually owned and are in control of other business entities that are unknown and are different that those who own and control the source and destination computers.

The defense process of this invention may generically be characterized as creating hidden markers or secret in the packet that enable a destination computer to quickly and efficiently separate a trusted class of packets from an un-trusted or unknown class of packets.

In one embodiment, the preferred embodiment, the network defense of this invention is based on using random source IP address from the sending computer, and may be deployed in the source and destination computers within a network. Such source and destination server and computers may include routers, hosts and clients. RIP Sec may also be used between the routers of a network that use protocol such as BGP to send control packets between the routers.

Hence this embodiment provides a defense function that separates a trusted class of packets from other packets, by uniquely encoding the source IF address of each packet in a sending server and decoding that encoded source IP address of the packet in a destination server, to be able to verify that the packet originated from a trusted source. This defense function also provides the computer network defense benefit that the original IP address or the origination of the packet(s) is hidden from those who would learn intelligence from the flow of packets inside the network.

The destination router or the destination computer can verify the true origin of the packets before accepting the packets for processing or routing inside the network. This, it is believed, was not possible in prior art, as the sender having the ability to make the source IF address could impersonate another sender. First replacing the original IP address to a random IP address and then reversing the random IP address to the original IP address enables the source of the packet to be verified as having truly originated from a known and trusted IP address.

In another embodiment, the network defense of this invention based on using random destination IP address may be deployed in the gateway and other routers of an internal-to-an-enterprise computer-network or a global-network. These embodiments may be used independently of each other and may also be used together. The defense function RIP Sec is further described, with reference, initially to FIGS. 1 and 2 as follows.

Figure 1:
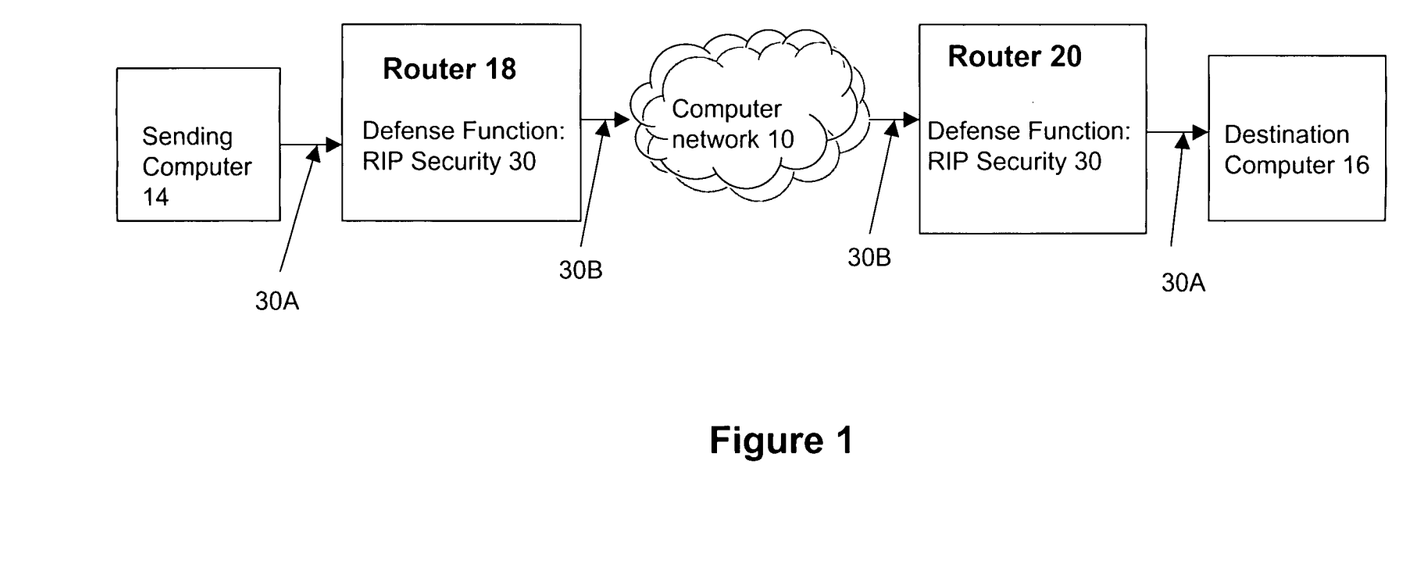
FIG. 1 is a block diagram that shows a version of computer network defense of this invention based on random source IP address.

With reference to FIG. 1, a sending computer 14 sends a packet 30A via a router 18, to computer network 10, where the router 18 has a defense function of RIP Security 30. The defense function 30 for each packet substitutes the original source IP address of packet 30A with a randomly obtained IP address, with the packet 30B now having the substituted random IP address, before routing out the packet 30B via the other in-route routers of the internet or intranet 10 to the destination router 20. This randomization of the IP address is described later. The destination router 20 then examines the packet's 30B randomly obtained source IP address, creates the original IP address, verifies that the original IP address is allowable based on access control list, substitutes the original IP address and forwards the packet with the original IP address 30A to the destination computer 16.

This process of randomizing the IP address can be carried out in either direction where the defense function of RIP security 30 has the ability to create random IP address from the original IP address and also has the ability to convert random IP addresses to the original IP address. The reversal of the random IP address to the original IP address is described later. The randomization of the source IP address is such that it is different for each packet or could be different for a set or group of packets. For example, a set of packets that are sequentially numbered as belonging to a single data set may have one random source IP address.

Figure 2:
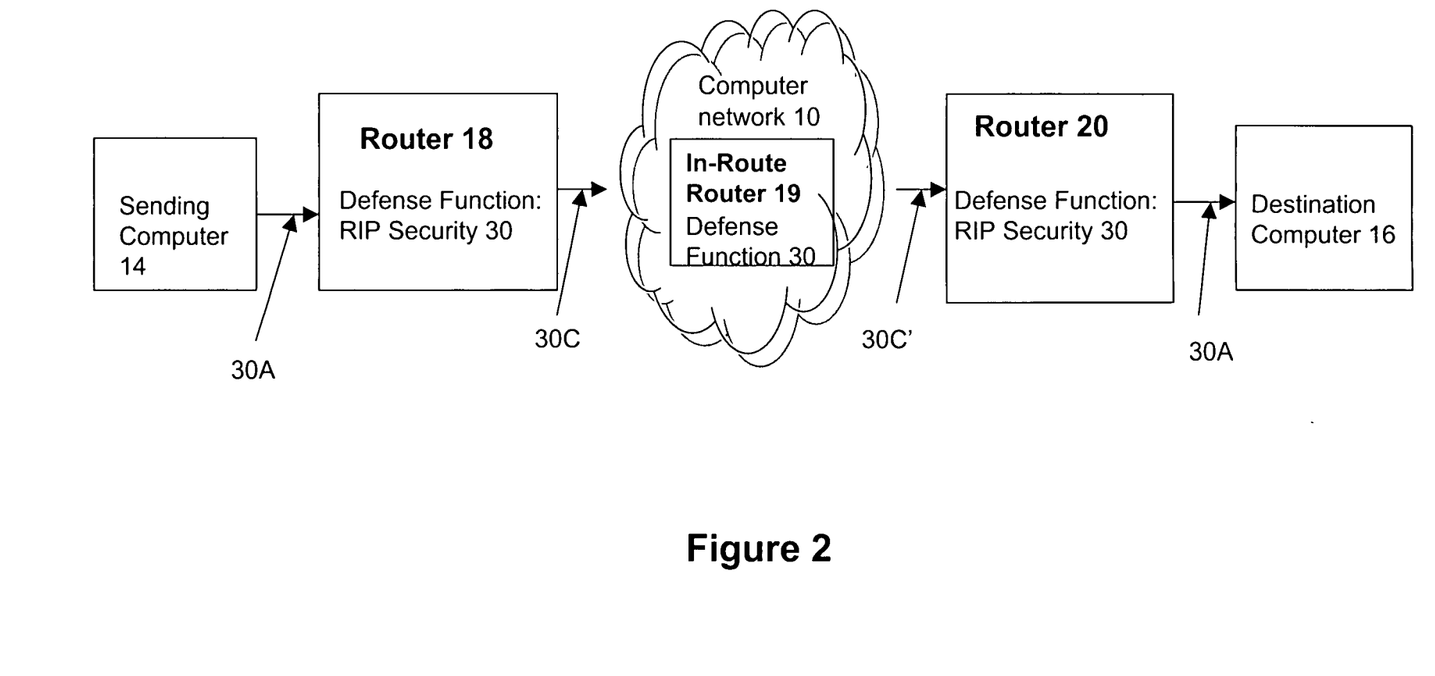
FIG. 2 is a block diagram that shows a version of computer network defense of this invention based on random destination IP address.

In another embodiment, illustrated with reference to FIG. 2, the randomization process can be used on the packet's destination IP address. This embodiment, for use for the destination IP address, requires that the in-route routers 19 have the defense function 30 in addition to the last router 20 before the destination computer 16. The packet 30A originating from the sender 14 has original source and destination IP addresses. The defense function 30 in router 18 replaces the original destination IP address with an encoded random destination IP address in the outgoing packet 30C to the computer network 10. In the computer network 10, an in-route router 19 with the defense function 30 would recreate original destination IP address, to make route decision and then create new substitute random destination IP address for each packet 30C prime that is routed out of the in-route router 19.

This process may be repeated at every in-route router that has the defense function. The in-route routers that do not have the defense function would route the packet based on the random destination IP address. Hence the random destination IP address would need to be limited to make the routing happen within a controlled zone of the routers of the internet, where the packet is routed to the in-route router that does have the defense function.

In this embodiment, the defense function RIP Sec 30 may be employed in all the routers or a subset of routers of the network 10. IP address has two parts, first part is used as a packet classifier and the second part is used for routing and node identification. The packet classifier may be used to identify the packets to in-route routers 19 that do have RIP Sec 30 and which do not and the in-route routers 19 that do have RIP Sec 30 may be strategically distributed in the network 10. Only those in-route routers 19 that are trusted may have RIP Sec logic 30. Alternatively, other approaches may be used to route the packets to only those in-route routers that have the defense function 30.

What is described below is an approach to randomly encode and decode the source IP address of a packet. Other techniques of encoding and decoding the IP address are not ruled out that may be used in addition to or in place of the preferred technique described herein. For example, one technique may be to select a substituted IP address whose digit sum is equal to a known constant or a known variable. So that the destination computer or router can verify that a trusted sender computer had created source IP address of the packet and thus verify that the packet originated from a known sending computer.

RIP Sec is a system of computer network defense security that has an IP-security function in a gateway router that substitutes original IP addresses in an individual data packet header with randomly derived IP addresses, for hiding the source and destination addresses of data packets within a network.

RIP Sec 30 is implemented at IP level, wherein the IP addresses are replaced with another random IP address from a random IP list that is pre-placed at various routers. RIP Sec enables the IP address to be randomly different for each packet that provides no clue where the packet came from and where it is going. Each router along the route has to discern for a moment in time the original real IP address using the optional data fields and the RIP Sec logic and make a route decision. A parameter that allows for this substitution and then subsequent reversal of that substitution at each router with the help of RIP Sec logic, is in the header of the data packet in the form of an optional data field.

These embodiments are described herein. Headings are provided for the reader's convenience.

In its operation, the defense function using Random IP Address Security (RIP Sec) maintains a plurality of random ordered IP address lists. Such lists include IP addresses from those in the autonomous network and may also include wild ones at large outside the autonomous network. The size of these lists may vary and number of IP addresses in each list may number in thousands, though shorter or longer lists are equally viable. The number of lists themselves may vary and may number in tens. In general, shorter the list, more lists would be needed and larger the size of the list, fewer lists may be needed.

In brief, for the outgoing data traffic, for each packet, source IP address is read, the RIP Sec logic is applied to it to get an alias IP address and supporting data. The original source IP address is replaced with the alias IP address and supporting data is packed In optional data field in the header and then the packet is routed out. For the Incoming data traffic, for each packet, source IP address and optional data field In the header are read, the RIP Sec logic is applied in reverse to obtain the original source IP address. The original source IP address is checked against the Access Control List, and the packet is routed inside the network.

Random IP Address Security (RIP Sec) 30

Figure 3:
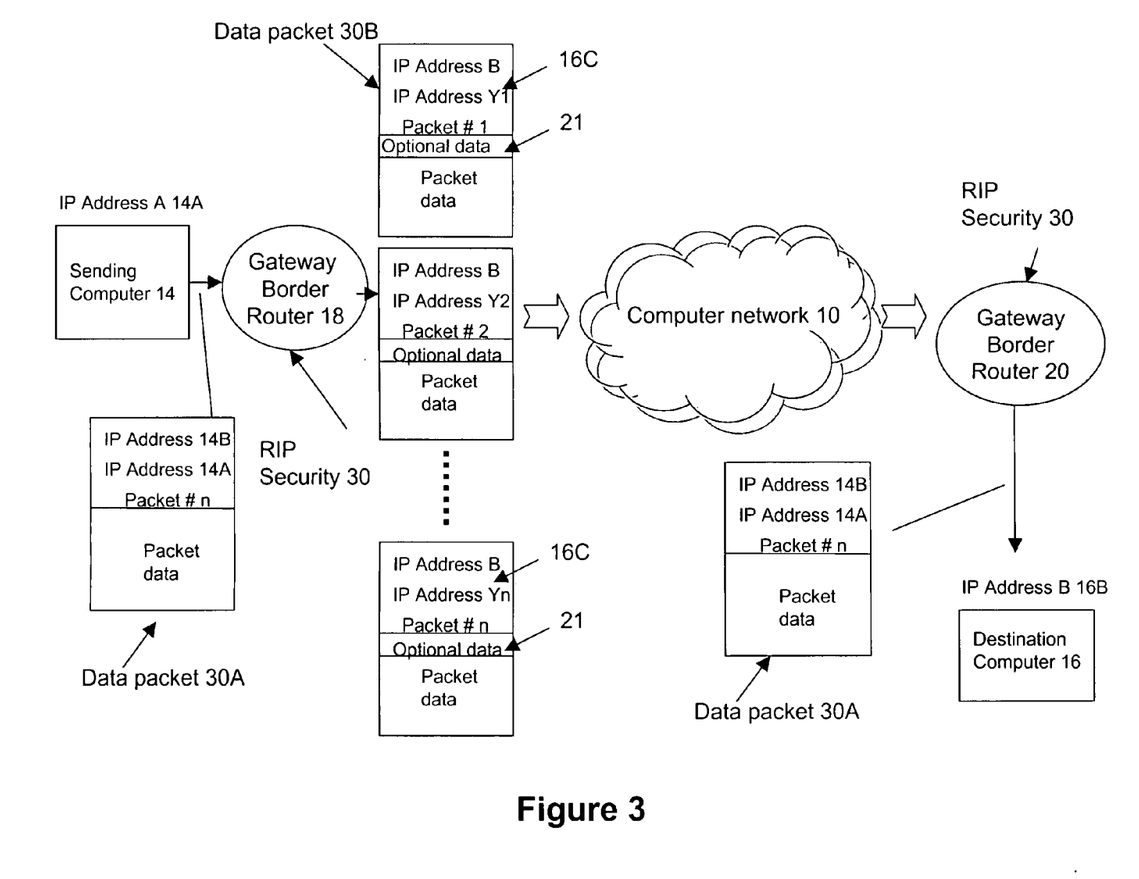
FIG. 3 is a block diagram that shows a version of computer network defense of this invention using random source IP address in a packet.

In FIG. 3, what is shown is a computer network 10, a sending host 14, with IP address 14A, a receiving host 16, with IP address 14B, a sending gateway router 18 and a receiving gateway router 20. The RIP Sec logic 30 is deployed in the border routers 18 and 20. The data packet 30A originating from host 14 has source IP address 14A and destination IP address 14B.

The border router 18 using the RIP Sec 30 alters the source IP address 14 A to a random IP address Y(1) to Y(n), that is different for each packet, as illustrated in data packet 30B. These packets 30B, originating out of the border router 18 are routed into the computer network 10.

The receiving border router 20, receiving the packets 30B, deploying the same RIP Sec 30, reverses the process to obtain data packet 30A with the source IP address 14A before routing it to the destination host 16.

The RIP Sec 30 is further described with reference to FIGS. 4, 5, 6 and 7. RIP Sec function has three sub-functions RIP Sec Function A as illustrated in FIG. 4, RIP Sec Function B as illustrated in FIG. 5 and RIP Section C, as illustrated in FIG. 6.

Figure 4:
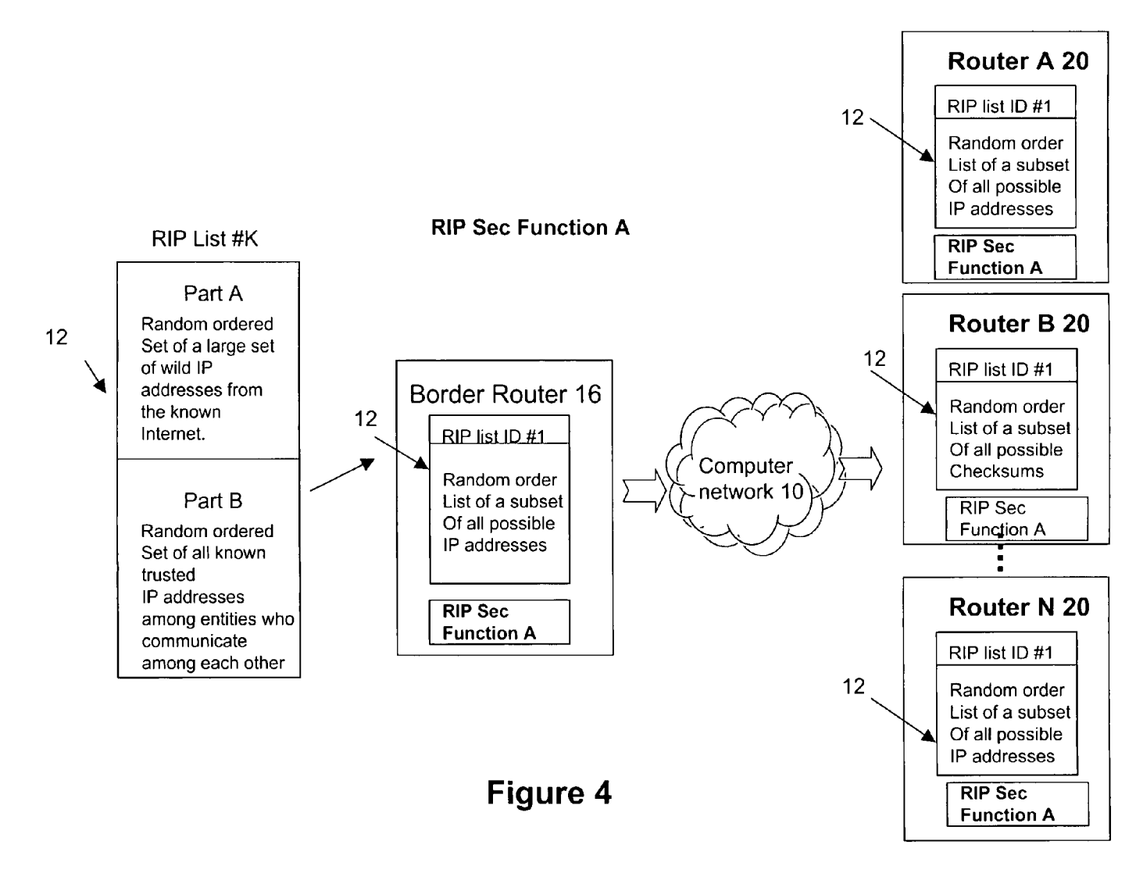
FIG. 4 is a block diagram that illustrates the functions of a random IP Address security function of this invention for managing random IP address lists.

As illustrated in FIG. 4, RIP Sec 30 function A in the border routers 18 and 20 creates a plurality of random order IP address lists 12. These lists 12 may be created in any number of ways by randomly ordering a large subset of IP addresses. The list embeds two types of IP addresses, as Part A and as part B. Part A is those IP addresses that are in the autonomous system (AS) of businesses, and Part B are those IP addresses from the wild in the internet. These two parts A and B may be mixed together in a one list in a random manner or be stacked on top of each other in the list. Each part in itself is random ordered. There may be plurality of such lists, each list has its own unique random order set of IP addresses. The lists are identified or referenced by a list identification (ID) number. In addition a list 12A, as shown in FIG. 7 may be used that uses a random order list of mathematical operators, each referenced by an operator code 17C.

RIP Sec 30 Function A, as illustrated in FIG. 4, arranges the presence of the list at the gateway border routers, such as from 18 to 20 and optionally in other in-route routers that are part of a network. This distribution or exchange of lists may be done by one of the methods from a group of, use of a standard Internet protocol, by out of band method, and by manual method.

Figure 5:
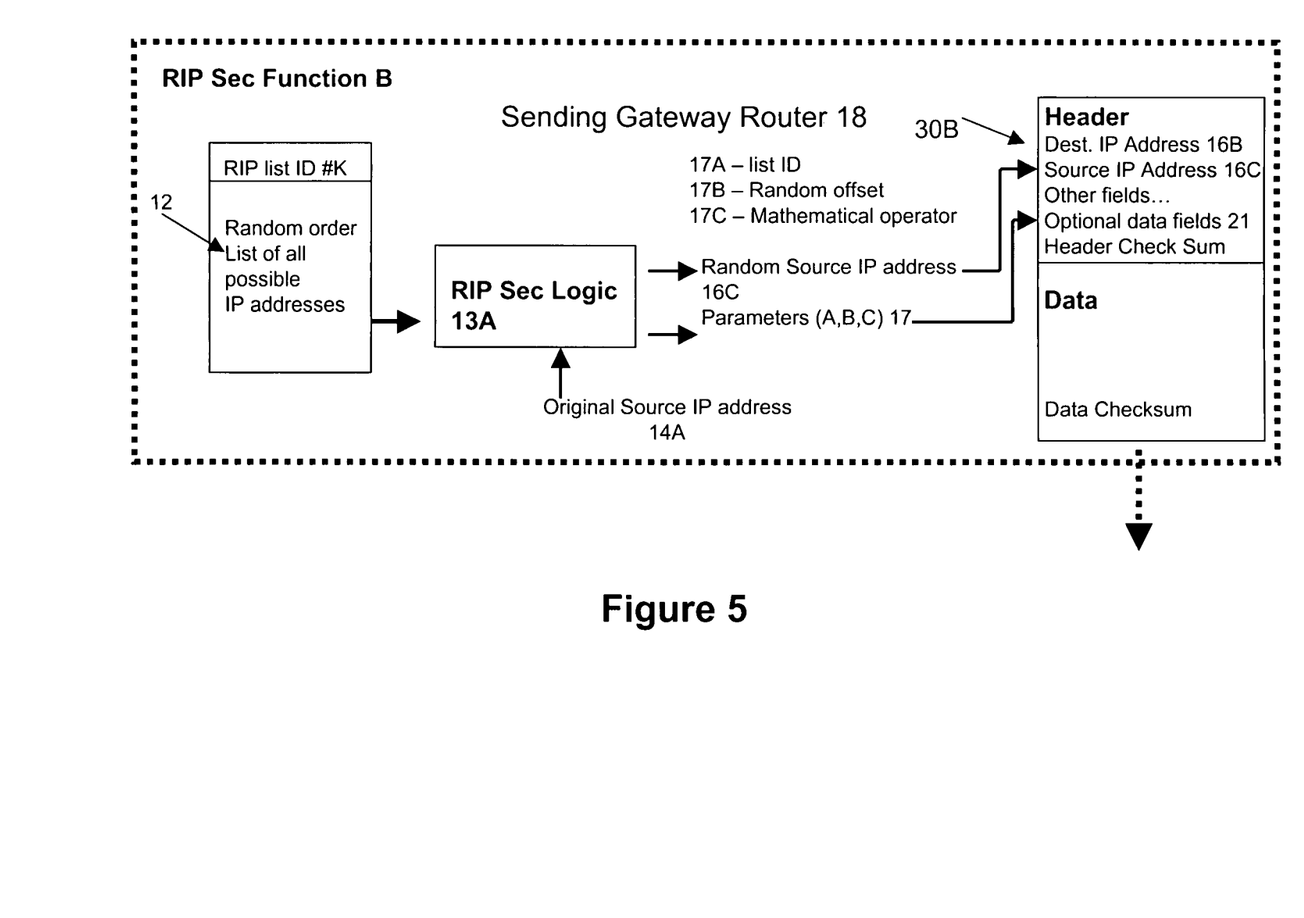
FIG. 5 is a block diagram that illustrates the functions of a random IP Address security function of this invention in a source server.
Figure 6:
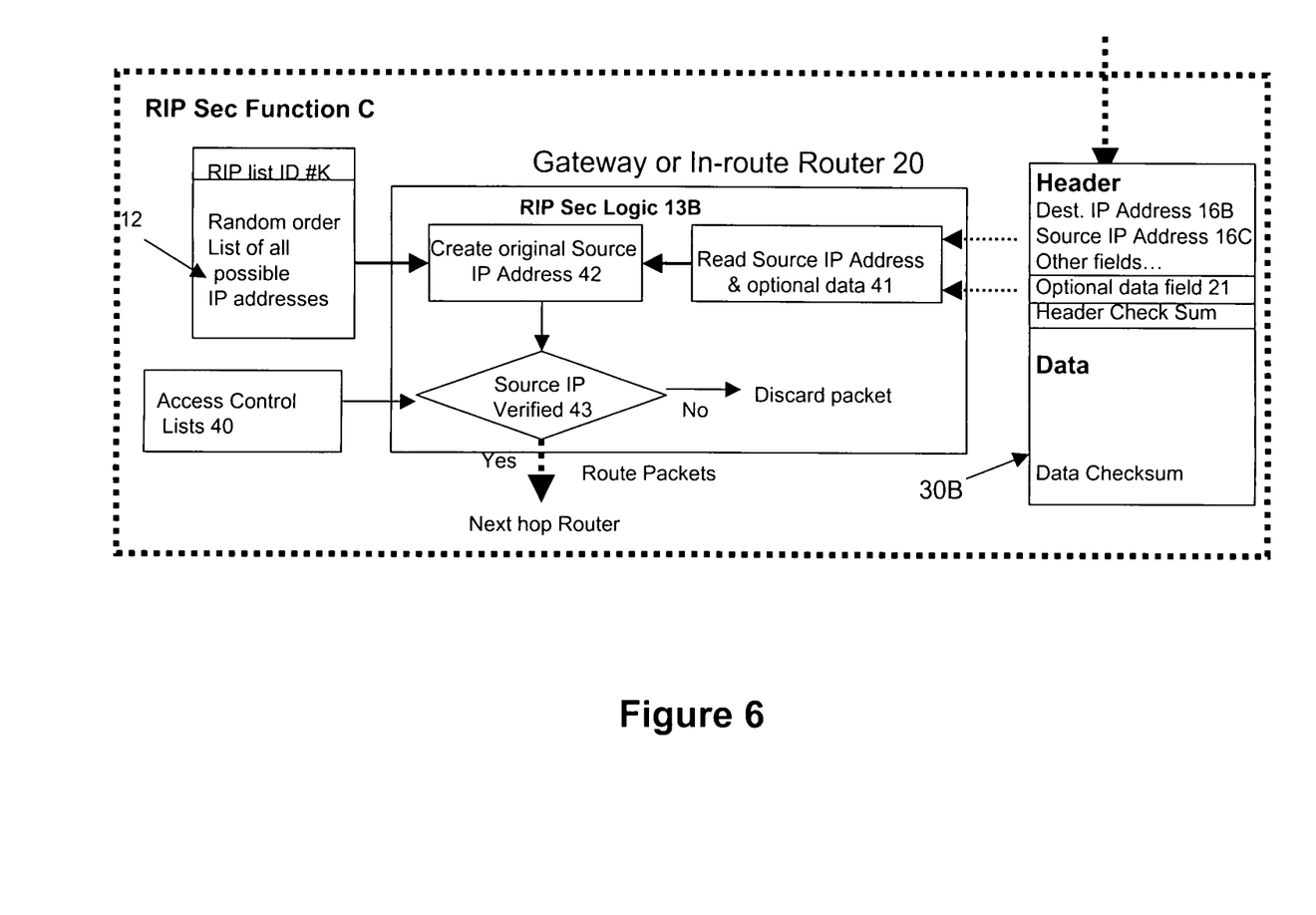
FIG. 6 is a block diagram that illustrates the functions of a random IP Address security function of this invention in a destination server.

RIP Sec 30 Function B, is illustrated in FIG. 5, in a sending gateway router 18. For a data packet 30B being routed, RIP Sec Logic 13A, substitutes original source IP address 14A with a Random IP address 16C obtained from a pre-arranged random list of IP addresses 12. The RIP Sec logic 13A also adds a data string in the packet's 30B optional data field 21 that identifies parameters 17 that would enable re-creating the original source IP address 14A from the Random IP address 16C, at a subsequent in-route or border router 20, having the same pre-arranged list of IP addresses 12. Thus enabling verifying the original source IP address against an access control list before routing the packet inside the network.

Figure 7:
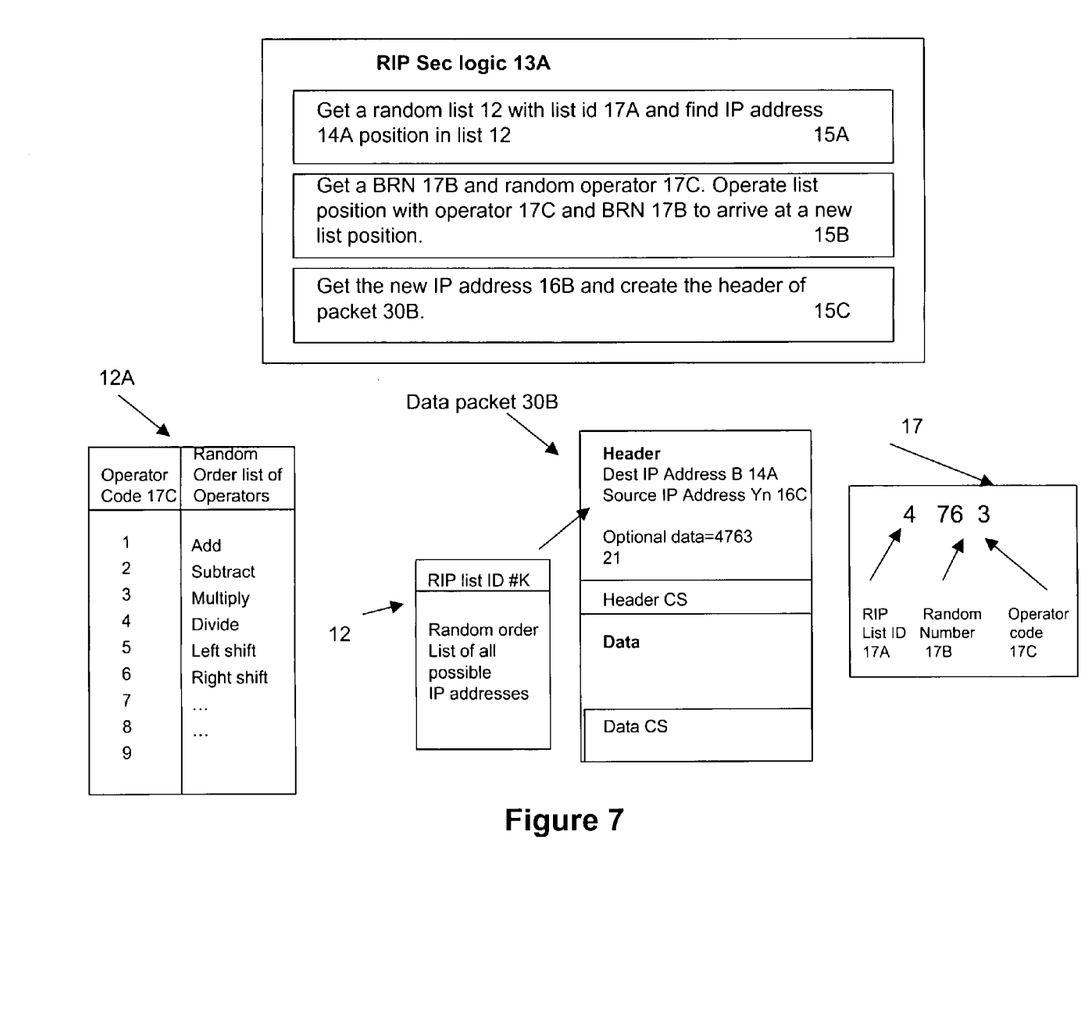
FIG. 7 is a block diagram that illustrates the functions of random IP Address lists of this invention.

The identifying-parameters 17, as illustrated in FIG. 7, include from a group of, an IP address list id 17A, a bounded random number 17B, and a mathematical operator code 17C. The list id 17A is used to identify the specific list from a plurality of lists 12. The bounded random number 17B and the mathematical operator 17C are together used to alter the original source IP address 14A position in the list 12 to get a Random-source IP address 16C from the same list 12. A similar operation may be performed to alter the original destination IP address 14B to get a random destination IP address 16B.

FIG. 7 also illustrates the features and functions of RIP Sec logic 13A related to substitution. The RIP Sec logic 13A, that creates the Random IP address 16C from original IP address 14A has: (i) a sub-function 15A that finds the list position of the original IP address 14A in the IP address list 12, (ii) a sub-function 15B that generates a bounded random number 17B, and randomly selects a mathematical operator 17C from a group of add, subtract or multiply, (iii) a sub-function 15C that operates the selected mathematical operator with the bounded random number, and the original IP address list position, to arrive at a new list position and reads the IP address at the new list position as a Random IP address 16C. The process details of RIP Sec logic 13A for an outgoing packet are:

1. Input=source IP address from the outgoing packet.
2. Randomly pick a list from the many lists.
3. Generate a bounded random number (BRN), that is in a range that is bounded or limited.
4. Select an operator.
5. Look up the source IP address in the list, note its location in the list.
6. Apply the operator with the BRN and the location in the list to get a new location in the list.
7. Read IP address in the list from the new location, as an alias IP address.
8. Pack in a supporting 16 or 32-bit word, the list id, the operator id and the BRN.
9. Output=the supporting data word as an optional data field and the alias IP address as the new source IP address in the outgoing data packet.
10. Repeat for every outgoing packet or a set of packets of a data set.

RIP Sec 30 Function C, as illustrated in FIG. 6, at an in-route router or border router 20, that implements the RIP Sec 30 has the RIP Sec logic 13B, that reads 41 the optional field 21 and the Source IP address 16C from the header of the packer 30B and recreates 42 the original source IP-address 14A to verify the source IP address 14A against the access control lists 40, to make a routing decision 43, to route the packet or discard the packet.

The border router 20 would substitute the original source IP address 14A in the packet before routing it inside the protected network. An in-route router, would either leave the destination IP address 16B or perform another substitution as in RIP Sec 30 function A, as described earlier with reference to FIGS. 5 and 7.

The process details of RIP Sec logic 13B for an incoming packet are:
1. Input=source IP address 16C and optional data field 21 from packet header.
2. Parse the optional data to get list id, BRN and the operator code.
3. Find IP address location in the list identified by the id.
4. Find the operator from the operator code and operate the operator on the BRN and the list location to obtain the list location that has the original source IP address 14A.
5. Check the original source IP address against an access control list (ACL)
6. Replace the original source IP address in the packet
7. Delete the op data field.
8. Output=the packet with the original IP address 14A in the header.
9. Repeat for every incoming packet.

In brief, the security process provided by RIP Sec 30 function C, for the source IP address 14A is in reversing the alias source IP address 16C to obtain the original source IP address 14A. That security process is provided by a combination of the list id 17A, the specific list 12 itself, BRN 17B and the operator 17C. The list id 17A, BRN 17B and Operator code 17C, are not stored anywhere, except in the optional data field 21 of the packet 30B during transmission. List id 17A, the BRN 17B and the operator code 17C in the optional data field 21 of a packet 30B are randomly selected for each packet and used once become stale or no longer useful.

RIP Sec method of computer network security may have the following steps, where all the steps may not be used or used in the order specified herein.

For Source IP address in a packet:

Step 1, arranging the presence of the list at the gateway routers and in-route routers that are pat of a network, by one of the methods from a group of, use of standard protocol, by out of band method, and by manual method.

Step 2, in a data packet being routed, replacing the original Source IP addresses with a security-IP address obtained from a pre-arranged random list of IP addresses.

Step 3, adding a data-string in the packet's optional data-field that identifies the parameters that would enable re-creating the original source IP addresses at a destination security gateway router that has the same pre-arranged list of IP addresses, before routing the packet to the destination node.

Step 4, the parameters include from the group of, an IP address list identification, a bounded random number and a mathematical operator code, wherein the list id is used to identify the list and the bounded random number and the mathematical operator are used to alter the original IP address position in the list to get a security-IP address from the same list.

For destination IP address in a packet:

Step 5, at a sending security gateway router, in a data packet being routed, replacing original destination IP address with a security-IP address obtained from a pre-arranged random list of IP addresses.

Step 6, adding a data string in the packet's optional data field, identifying the coefficients that would enable re-creating the original destination IP addresses at a subsequent router having the same pre-arranged list of IP addresses, thus enabling routing the packet based on the original destination IP address.

Step 7, finding the list position of the original IP address, generating a bounded random number, selecting a mathematical operator from a add, subtract or multiply, operating the random number with the list position to arrive at a new list position and reading the IP address at the new list position as a security-IP address.

Step 8, at an in-route router, as a first means of security reading the optional field for the data string and recreating the original destination IP-address to make a routing decision, leaving the security-IP address in place in the data packet.

Step 9, at an in-route router, as a second means of security, reading the optional field for the data string and recreating the original destination IP-address to make a routing decision, and then recreating a news destination IP address in the data packet along with a new corresponding data in the optional data field of the packet.

In summary, RIP Sec 30, by making a novel use of the unique randomization of the IP address of a packet provides network defenses and network security. The benefits are these are simpler and more secure scheme because: they do not use encryption, hence less resources; use existing TCP/IP and other Router Interface protocols. RIP Sec 30 provides better security by per packet camouflage of source IP addresses, the packets that use RIP Sec have a random selected IP address that is different for each packet, and thus RIP sec has the ability to quickly separate trusted packets by using the source IP address. Further the RIP Sec 30 process may be used selectively in a subset of a network and not in all nodes of a network.

What is claimed is:

1. A computer network defense system that separates trusted packets from un-trusted packets in a computer network, comprising:
    a defense function that separates a trusted class of packets from other packets in a computer network, by hiding the source IP address of each packet within another IP address in the packet header by using a hiding function that substitutes an original source IP address with a security-IP address obtained from a prearranged random list of IP addresses and recovering that hidden IP address of the packet in another part of the network by using a recovering function with the same prearranged random list of IP addresses and comparing the recovered source IP address to trusted IP addresses to verify that the packet had originated from a trusted source.

2. The system as in claim 1, further comprising:
    the hiding and recovering functions are performed on the IP address of the packet that includes one of, the source IP address, the destination IP address, or both the source and the destination IP addresses.

3. The system as in claim 1, further comprising:
    the hiding and recovering functions are present in one or more of in-route routers, border routers, and destination routers and computers enabling them to discard packets that are not verified as having originated from a trusted source.

4. The system as in claim 1 comprising:
    the hiding function substitutes an original source IP addresses in an individual data packet header with a randomly derived source IP address, wherein a method of deriving the randomly derived source IP address from the original source IP address is a secret between source and destination servers.

5. The system as in claim 1, further comprising:
    the hiding function substitutes the original source IP address with a security-IP address obtained from a pre-arranged random list of IP addresses and adds a data string in the packet's optional data field, identifying parameters that would enable re-creating the original source IP address from the security-IP address, at a subsequent router having the recovering function with the same pre-arranged list of IP addresses.

6. The system as in claim 5, comprising:
    the identifying-parameters include from a group of, an IP address list identification (id), a bounded random number, and a mathematical operator code, wherein the list id is used to identify the list and the bounded random number and the mathematical operator are used to alter the original IP address position in the list to get a security-IP address from the same list.

7. A method of computer network defense that separates a trusted class of packets from other packets for computer network defense, comprising the steps of:
    a. hiding the source IP address of a packet in a sending server within another IP address in a packet header using a hiding function by substituting original source IP address with a security-IP address obtained from a pre-arranged random list of IP addresses;
    b. recovering that hidden IP address of the packet in a destination server, with a recovering function with the same pre-arranged random list of IP addresses and comparing the recovered source IP address to trusted IP addresses thereby verifying that the packet originated from a trusted source.

8. The method as in claim 7, further comprising the steps of:
    hiding and recovering the IP address of the packet that is one from, a source IP address, a destination IP address, or both the source and the destination IP addresses.

9. The method as in claim 7, further comprising the steps of:
    positioning the hiding and recovering function in one or more of, source computers, border routers, in-route routers, and destination routers enabling them to discard packets that are not from a trusted source.

10. The method as in claim 7 comprising the steps of:
substituting original source IP addresses in an individual data packet header with a randomly derived source IP addresses, as part of the hiding function, where the method of obtaining the random IP address from the original source IP address is a secret between source destination servers.

11. The method as in claim 7, further comprising the steps of:
substituting original source IP address with a security-IP address obtained from a pre-arranged random list of IP addresses and adding a data string in the packet's optional data field, identifying parameters that would enable re-creating the original source IP address from the security-IP address, at a subsequent router having the recovering function with the same pre-arranged list of IP addresses.

12. The method as in claim 11, comprising the steps of:
including identifying-parameters from a group of, an IP address list id, a bounded random number, and a mathematical operator code, wherein the list id is used to identify the list and the bounded random number and the mathematical operator are used to alter the original IP address position in the list to get a security-IP address from the same list.

13. A method of computer network security comprising the steps of:
replacing an original source IP address, in a data packet being routed, with a security-IP address that is randomly obtained from a pre-arranged random list of IP addresses that hides the original source IP address as a secret and re-creating the original source IP addresses at a destination security gateway router having the same pre-arranged random list of IP addresses.

14. The method as in claim 13, comprising the steps of:
adding a data-string in the packet's optional data, identifying the parameters that would enable re-creating the original source IP addresses at a destination security gateway router having the same pre-arranged list of IP addresses, before routing the packet to the destination node.

15. The method of computer network security as in claim 13, comprising steps of:
a. at a sending security gateway router, in a data packet being routed, replacing original destination IP address with a security-IP address obtained from a pre-arranged random list of IP addresses;
b. adding a data string in the packet's optional data field, identifying the coefficients that would enable re-creating the original destination IP addresses at a subsequent router having the same pre-arranged list of IP addresses, thus enabling routing the packet based on the original destination IP address.

16. The method as in claim 15, comprising the steps of:
at an in-route router, reading the optional field, in the packet, for the data string and recreating the original destination IP-address to make a routing decision, and then in the data packet being routed, replacing original destination IP addresses with another security-IP address obtained from a pre-arranged random list of IP addresses and updating the data string in the optional data field of the packet, before routing the packet to the destination node.

17. The method as in claim 13, comprising the steps of:
the parameters include from the group of, an IP address list identification, a bounded random number and a mathematical operator code, wherein the list id is used to identify the list and the bounded random number and the mathematical operator are used to alter the original IP address position in the list to get a security-IP address from the same list.

18. The method as in claim 17, comprising the steps of:
finding the list position of the original IP address, generating a bounded random number, selecting a mathematical operator from a add, subtract or multiply, operating the random number with the list position to arrive at a new list position and reading the IP address at the new list position as a security-IP address.

19. The method as in claim 13, comprising the steps of:
at an in-route router, reading the optional field for the data string and recreating the original destination IP-address to make a routing decision, leaving the security-IP address in place in the data packet.

20. The security method in a computer network, as in claim 13, comprising the step of:
arranging the presence of the list at the gateway routers and in-route routers that are part of a network, by one of the methods from a group of, use of standard protocol, by out of band method, and by manual method.

\* \* \* \* \*